United States Patent [19]
Reid et al.

[11] 3,857,985
[45] Dec. 31, 1974

[54] POURABLE LIQUID SHORTENING

[75] Inventors: Edward Reid, Brea; Perry W. Morgan, Jr., Fullerton, both of Calif.

[73] Assignee: Hunt-Wesson Foods Inc., Fullerton, Calif.

[22] Filed: July 23, 1973

[21] Appl. No.: 381,527

[52] U.S. Cl. ............................... 426/362, 426/417
[51] Int. Cl. ............................................... A23d 5/02
[58] Field of Search ............ 426/362, 363, 417, 194, 426/198, 202, 200, 197

[56] References Cited
UNITED STATES PATENTS

| | | | |
|---|---|---|---|
| 2,521,242 | 9/1950 | Mitchel | 426/194 |
| 3,028,244 | 3/1959 | Kearns | 426/417 |
| 3,325,292 | 6/1967 | Endres | 426/262 |
| 3,395,023 | 7/1968 | Haughton | 426/417 |
| 3,404,985 | 10/1968 | Strobel | 426/362 |
| 3,499,133 | 6/1969 | Dobsen | 426/147 |
| 3,595,674 | 7/1971 | Shaffer | 426/362 |
| 3,623,888 | 11/1971 | Brea | 426/362 |

*Primary Examiner*—Samih N. Zaharna
*Assistant Examiner*—Ernest G. Therkorn
*Attorney, Agent, or Firm*—Gerald L. Price

[57] ABSTRACT

A warm suspension of normally solid triglycerides in a liquid fatty ester oil at a temperature above the melting temperature of the normally solid component is dynamically and incrementally cooled to a temperature below the phase change of the solid component from alpha and beta prime to beta crystals by a dynamic process including forming a large constant temperature body of the solid component and oil base stock, continuously removing from the body a portion of the mixture and rapidly cooling the removed portion to a temperature below the crystallization point and returning the cooled portion to the warm body of oil. The circulation process is continued until the body is completely transformed to a stable suspension of beta crystals in the oil base stock and then the stable suspension is deaerated and packaged.

21 Claims, 2 Drawing Figures

POURABLE LIQUID SHORTENING

BACKGROUND OF THE INVENTION

1. Field of the Invention

The present invention relates to liquid shortenings and, more particularly, to an improved continuous process for manufacturing such shortenings, suitable for normal baking and frying uses.

2. Description of the Prior Art

Liquid shortenings were developed since they are more convenient to use than plastic shortenings in that they can be more readily dispensed and measured in frying applications and can be more readily mixed with other ingredients in making baked products. With the advent of high-volume, low-cost food service outlets which require the use of large food fryers, there has developed a demand for pourable liquid shortenings to charge the fryers and to replenish oil as it is consumed during use.

The pourable liquid shortenings have conventionally been manufactured by a batch process requiring rapid cooling of a static batch of normally solid triglycerides in a liquid fatty ester oil, tempering the batch at an elevated temperature and recooling the batch to form an opaque, pumpable suspension of beta crystals in an oil base. During cooling the temperature must be strictly controlled at a small increment above the alpha phase transition temperature and the agitation must be maintained below shear in order to affect the desired transition to the beta phase. The apparatus for the process requires a costly capital expenditure and the cost of operating the process is unduly expensive due to the critical process control required.

SUMMARY OF THE INVENTION

An improved process for producing a pourable liquid shortening is provided in accordance with the invention which does not necessitate tempering at an elevated temperature for long periods, does not require rapid cooling of a large batch, nor does it involve secondary cooling of the material to provide a stable suspension of crystals in a liquid base stock. The process of the invention does not involve elaborate or critical control of temperature or mixing rate and is much simpler, efficient and economical than prior art processes.

The process in accordance with the invention involves the steps of forming a warm mixture of a minor amount of normally solid triglycerides in a liquid base stock and rapidly chilling a portion of the mixture to a temperature below the cloud point to form a suspension of crystals and returning the suspension to the warm batch. The solids formed during rapid chilling immediately melt and incrementally lower the temperature of the mass dynamically. The dynamic process is continued until equilibrium is reached at which point the solid crystals returning to the batch are not completely melted but are transformed and converted from the lower polymorphic alpha and beta prime forms to the stable beta crystal form. These crystals then act as a seed for further crystallization-melting-crystal phase transformation until the total mass of the batch is converted into beta phase crystals stably suspended in the base oil stock. The converted mass is then deaerated and packaged. Additives such as antifoam agents and antioxidants are added prior to deaeration and packaging.

The invention will now become better understood by reference to the following detailed description when considered in conjunction with the accompanying drawings.

DESCRIPTION OF THE PREFERRED EMBODIMENTS

Figure 1:
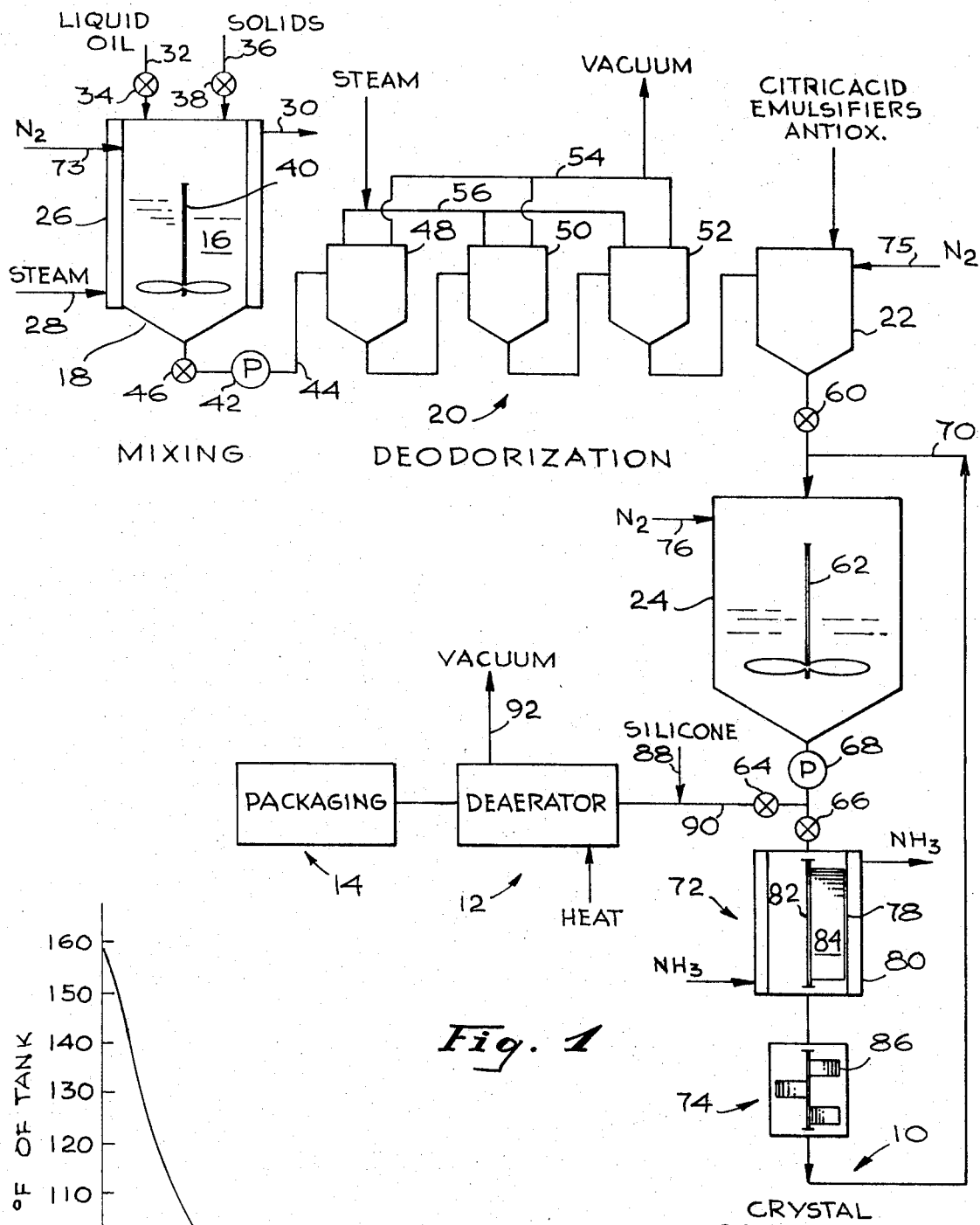
FIG. 1 is a schematic view of apparatus suitable for practicing the process of the invention.

The pourable, opaque liquid shortening produced by the process of the invention comprises a liquid triglyceride vehicle in which is dispersed substantially uniformly and stably from about 1 percent to about 10 percent of finely divided, substantially fully saturated fatty glycerides, at least 80 percent of these saturated fatty glycerides being in the form of beta-phase crystals. A preferred formulation for forming a pourable fluid frying shortening suitable for ambient temperature storage from 60°F to 100°F contains from about 2 percent to 7 percent of finely divided, substantially fully saturated, fatty glycerides, at least 85 percent of which are in the form of beta-phase crystals.

The liquid glyceride base stock oil which serves as a vehicle for the suspension of crystals should consist primarily of triglycerides. If the vehicle contains any glycerides having melting points higher than 60°F, these solids should be considered within the total of the permissible solids for forming a stable suspension. It is desirable that the glyceride oil vehicle be chemically stable and resistant to oxidation. Suitable oils may be derived from naturally occurring liquid glyceride oils such as soybean oil, cottonseed oil, peanut oil, corn oil, safflower oil, sesame seed oil, and sunflower seed oil. Liquid oil fractions obtained from palm oil, lard or tallow by graining or directed interesterification followed by separation of the oil may be utilized. Oils containing excessive unsaturation may be hydrogenated to maintain flavor, suitably to an IV level of between 110 and 120. Refined cottonseed oil which has an IV of about 108 to 110 may be utilized as the vehicle. Refined, partially hydrogenated soybean oil having an IV of about 115 has proved very satisfactory. The gamma (fully saturated) content of partially hydrogenated soybean oil is between about 0.3 to 0.5 percent.

The vehicle may include some glycerides in which one or more of the hydroxyl groups of the glycerin have been replaced by lower alkanoic acid radicals and one or more of the remaining hydroxyl groups of the glycerin have been replaced by acyl radicals of higher molecular weight saturated or unsaturated fatty acids having from 12 to 22 carbon atoms. The vehicle may be composed of mixtures of any of the above listed oils.

The finely divided, fatty glycerides which comprise the suspended portion of the vehicle must have a stable beta crystalline phase at ambient conditions and must be capable of being converted to this beta phase from an alpha or beta-prime phase. The crystals may be identified by x-ray diffraction analysis. Alpha-phase crystals are identified by a single, strong, short spacing at 4.15 A, the beta-prime crystals are identified by short spacing at 4.2 A and 3.8 A and the beta-phase crystals have a short spacing at 4.6 A. The fatty glycerides forming the solids must remain solid at temperatures as high as about 100°F since it is important that during temperature cycling that the product will experience that very few of the solids recrystallize in the form of interlacing crystals which would impair the fluidity of the shortening. Melting of the solids between 60°F and 100°F may also tend to cause a separation of the liquid and solid phases at higher temperatures.

The normally solid, fatty glycerides are comprised of substantially saturated, solid glycerides having an IV value not greater than about 10, preferably not greater than about 5, and are formed of normally solid, triglycerides having strong beta-forming tendencies such as tristearin, tripalmitin and others such as symmetrical palmito distearin or mixtures thereof. Included also are substantially completely saturated type triglyceride fats made by hydrogenation of vegetable and animal oils such as soybean oil, safflower oil, sunflower seed oil, corn oil, linseed oil, hazelnut oil, olive oil, or mixtures thereof. A portion of the gamma, i.e., fully hydrogenated vegetable oil, may be provided by the partially hydrogenated liquid oil vehicle or by stearin. For example, soybean oil stearin having an IV of 100-105 has a gamma (fully saturated) content of about 0.6 to 1 percent.

For a pourable liquid frying shortening the normally solid glycerides may totally comprise fully hydrogenated triglycerides. In a baking shortening such as for baking breads or cakes, an emulsifier is added. The glyceride solids should be composed partly of mono- or diglycerides or ethoxylated diglycerides of fatty acids having from 16 to 22 carbon atoms. At least 1 percent to 2 percent by weight of the monoglyceride is necessary for baking purposes. A suitable emulsifier for cake shortening is stearoyl lactylate. The emulsifiers should be added to the initially formed heated batch at the start of the process, after deodorization and before crystallization. Antifoaming agents such as methyl silicone which may contain some fused silica which act as crystal nuclei and interfere with the alpha-beta phase change should not be added until just before packaging. The antioxidants are added at the same time in an amount less than 0.05 percent by weight and the methyl silicone is preferably maintained in a range of 1 to 6 ppm of the final shortening product.

Referring now to FIG. 1, the process of the invention generally comprises a crystal conversion stage 10 which is operated until the desired beta-phase change is effected and the product is then sent through a deaerator 12 to packaging 14. Preliminary to crystal conversion, the mixture 16 of liquid oil and beta-phase convertible solid glycerides is prepared in a heated mixing tank 18 and passes through deodorization stage 20 and cooling tank 22 before being added to the dynamic crystallization tank 24.

The mixing tank 18 can be heated by various means and suitably contains a jacket 26 through which steam is circulated through inlet line 28 and outlet line 30. The temperature of the mixture 16 is maintained above the melting point of the solids and is at a temperature of at least 100°F and usually no more than about 180°F, typically between about 140°F and 160°F. The liquid oil is added through line 32 when valve 34 is open and the solids are added through line 36 when valve 38 is open. The mixture is stirred by means of stirrer paddle 40 until homogenous.

The homogenous mixture is then pumped through line 44 to deodorization stage 20 by means of pump 42 when valve 46 is open. During deodorization small quantities of impurities which contribute to undesirable flavors and odors to the oil are removed. Deodorization is preferably practiced by a steam distillation technique utilizing a train of vessels in series, suitably three vessels 48, 50 and 52, each connected to vacuum through vacuum manifold 54 and each supplied with steam through steam manifold 56. Deodorization is typically conducted at a vacuum of about 5 mm to 10 mm of mercury at a temperature from about 400°F to about 600°F. The passage of live steam through the hot oil under high vacuum has the effect of stripping away the relatively volatile odorous materials present in the oil which are drawn off through the vacuum system and subsequently condensed. After sufficient treating time the deodorized oil is pumped to the cooling vessel 22 where it is cooled and appropriate additives such as antioxidants and metal scavengers are blended in. Suitable antioxidants are butylated hydroxy anisole (BHA) and butylated hydroxy toluene (BHT), each being added at a level of 0.01 percent on the basis of the mixture. A typical metal scavenger is citric acid present in an amount of 0 to 0.003 weight percent on the basis of the mixture.

The mixture is cooled to a temperature within the range stated for the mixture in tank 18, suitably from about 140°F to 160°F. Valve 60 is then opened and the mixture fills into crystallization tank 24 containing stirrer 62. Valve 64 is closed, valve 66 is opened and valve 60 is closed while pump 68 is actuated to circulate the mixture through the circuit line 70 containing scraped surface heat exchanger 72 and optionally a secondary mixer 74. Tanks 18, 22 and 24 are preferably nitrogen inerted by flowing nitrogen through lines 73, 75 and 76 into the respective head space of the tanks to prevent oxidative deterioration of the unsaturated oil feed stock during processing.

The scraped surface heat exchanger 72 is a cylinder 78 containing a jacket 80 through which is circulated a refrigerant such as ammonia. A rapidly rotating shaft 82 contains blades 84 which scrape the crystals off the surface of the cylinder 78. Such apparatus is conventionally used in the manufacture of shortening products and the typical device for this purpose is known as a Votator. As the mixture is fed into the Votator, the solids rapidly solidify when the mixture contacts the cold refrigerated surface. The solids are immediately scraped away and flow from the Votator in super cooled fluid condition. In the cylinder 78 the temperature drops very quickly within seconds.

The cold product may then be pumped through unit 74 containing a stirrer 86 which serves to homogenize the mixture before it is returned through line 70 to the tank 24. The stirrer 86 is typically a finger blade stirrer.

As the cooled suspension in line 70 enters tank 24, the solids formed during votation immediately melt and are incorporated into the mass. Since heat is not supplied to the tank 24, the temperature of the mass slowly begins to drop. Eventually an equilibrium condition is reached. At this point as the mass cools, solid crystals coming back into the feed tank are not completely melted but go from the lower polymorphic alpha and beta prime form to the stable beta crystal form. These crystals then act as a seed for further crystallization-melting-crystal phase transformation. Finally, all the crystals are converted to beta phase at which point valve 66 is closed, valve 64 is opened and methyl silicone at the desired level is injected through line 88 into line 90 as the product flows through the deaerator 12 to the packaging station 24. Since the tank 24 is continuously subjected to nitrogen through line 76, eventually the product becomes completely saturated with nitrogen. In the deaerator 12 vacuum is applied to the suspension at a temperature of from 72°F to 80°F. The vacuum (about 24–29 inches of mercury) is applied to the unit through line 92 to remove occluded gas from the product which is then packaged suitably into 5 gallon cans.

The invention will now be illustrated by the following examples.

EXAMPLE 1

| Ingredient | Wt. % |
| --- | --- |
| 115 IV soybean oil | 97 |
| 3 IV soy gamma | 3 |
| BHA | 0.01 |
| BHT | 0.01 |
| Methyl silicone | 4–6 ppm |

The above mixture of essentially liquid oil base stock and low IV hard component were melted and blended at 150°F and after deodorization and addition of the BHA and BHT was delivered to the tank 24. The mixture was then circulated through a Votator where the temperature was very quickly dropped to 55°F–60°F and then pumped through the mixer unit 74 where the temperature rose to 70°F. The 70°F stock was returned to the tank 24 where the crystals formed partially melted and the temperature of the bulk of the product dropped continuously. When the temperature of the mass in tank 24 was at 76°F, which is 8°F below the cloud point of the mixture, the mixture was subsequently held at this temperature a minimum of two hours to allow the crystallization and growth of the essentially completely saturated type triglycerides, i.e., the soy gamma, in the high-melting beta phase. The formulation of Example 1 was processed both in 13 lb. laboratory size equipment and in a scaled up 100 lb. pilot plant.

Samples representing the laboratory and pilot plant formulation were stored at dormant 60°F, 73°F and 100°F conditions and cycled for three days between 60°F and 100°F and examined periodically for pourability and clear oil separation. After approximately one month, the formulations were examined and were found to exhibit good viscosity during storage at 60°F and during the 60°F–100°F cycle storage. A comparative frying performance test of the product of Example 1 compared to commercially marketed beta phase suspension pourable liquid shortenings was determined by monitoring the color and free fatty acid (FFA) of the shortenings during the frying of breaded fish and potatoes in an electric deep-fat fryer. The data indicate that the color and FFA increase during frying are comparable.

EXAMPLE 2

A pourable liquid shortening was prepared in the apparatus of FIG. 1 from the following composition.

| Ingredient | Wt. % |
| --- | --- |
| Partially hydrogenated soybean oil (IV 116) | 50 |
| Soy stearin | 48.5 |
| Safflower gamma (IV-1.3) | 1.5 |

The product has a cloud point of 76.6°F. The throughput through the Votator was 55.9 lbs. per hour for the first ½ hour and then 39.0 lbs. per hour for an additional two hours. At this point the temperature had dropped from 162°F to 76°F in the holding tank, and the product was held an additional two hours before filling. A centrifuge test for five minutes at 2,500 rpm in a 50 cc tube indicated that the product contained 0.4 percent solids. The Votator unit was run at 800 rpm and the finger blade mixer at 1,000 rpm. The votator was cooled by a controlled supply of Freon which maintained the surface of the cylinder at a temperature of around 45°F. 4 ppm of methyl silicone was then added to the product which was deaerated and packaged.

EXAMPLE 3

A formulation containing 3 percent 3 IV safflower oil, 10 percent soy stearin, and 87 percent 115 IV soybean oil was processed in the 13 lbs. per batch laboratory equipment of Example 2 and in 100 lbs. per batch pilot plant equipment. The material was circulated from the holding tank through a Votator which quickly cooled the material to a temperature of about 55°F and after mixing in the finger blade mixer the product was returned to the tank at a temperature of about 76°F until a temperature of 78°F was achieved.

EXAMPLE 4

A laboratory size batch and pilot plant size batch of a mixture of 3 percent 3 IV safflower oil, the remainder being 115 IV soybean oil, were processed in accordance with the conditions of Example 3.

The formulations of the previous examples were subjected to storage stability at 60°F, 73°F and cycled 60°F/100°F. The product of Example 1 containing 97 percent 115 IV soybean oil and 3 percent 3 IV soybean oil provided the best storage and viscosity of all the samples prepared. The product of Example 4 which does not contain any soy stearin exhibited better viscosity and storage stability than the product of Example 3. A 60,000 lb. plant size run was produced according to the following example.

EXAMPLE 5

A 60,000 lb. blend of 97 percent 115 IV soybean oil and 3 percent of 3 IV soybean oil gamma was deodorized and, after addition of 0.01 percent BHA and 0.01 percent BHT, was pumped hot to a holding tank at 160°F. The hot mixture was recirculated through a 20,000 lb. per hour Votator system during which the temperature was dropped to about 55°F–60°F in the Votator and, after leaving the finger blade mixer, the 70°F stock returned to the holding tank where the crystals formed partially melt and the temperature of the bulk of the product in the tank drops. After 13 hours of chilling and recirculating, the target temperature of 76°F was achieved and maintained for an additional 2 hours. 4 ppm of methyl silicone was then injected into the product and the product was pumped through a DeLaval Vacutherm deaerator before filling into 5 gallon cans.

Figure 2:
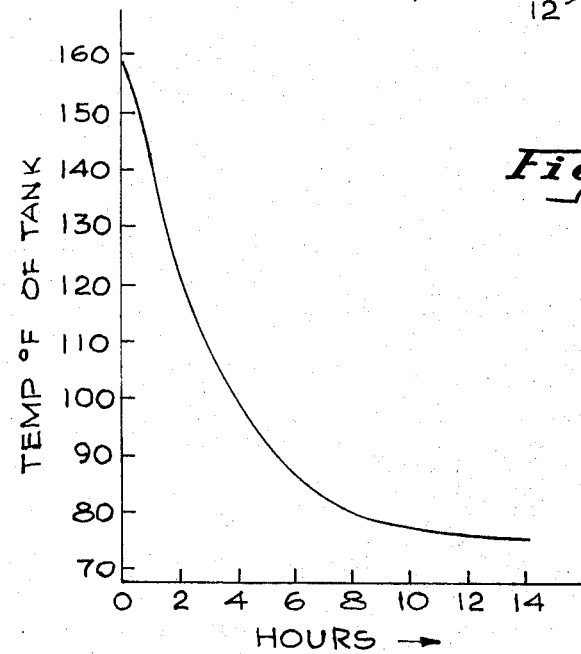
FIG. 2 is a typical cooling curve of a large plant run showing the temperature history of the oil-solid mixture in the process.

Even after a months storage the formulation of Example 5 exhibited good viscosity during storage at 60°F and 60°F/100°F cycle storage. A cooling curve of the run is illustrated in FIG. 2. Analysis of the product of Example 5 before and after crystallation was conducted and the data is presented in the following table.

Table 1

| Before Crystallization | | |
|---|---|---|
| Color | | 0.7 |
| FFA | | 0.025 |
| P.V. | | 0.10 |
| BHA | | Positive |
| Flavor | | 8 |
| Cloud Point, °C | | 27.4 |
| Moisture, % | | 0.0 |
| Iron, ppm | | 0.5 |
| Stability, AOM, | | 25 |
| *SFI, %, °F at | 50° | 6.05 |
| | 70° | 4.70 |
| | 80° | 5.00 |
| | 92° | 3.80 |
| | 104° | 2.85 |
| After Crystallization | | |
| Solids, % at 75°F | | 0.5 |
| Viscosity, Brookfield cps | | 300 |

*Solid Fat Index - AOCS Official Method

For the formulation of Example 5 the maximum solids level in the form of beta crystals is preferably maintained below 1 percent.

It is to be understood that only preferred embodiments of the invention have been described, and that numerous substitutions, alterations, and modifications are all permissible without departing from the spirit and scope of the invention as defined in the following claims.

What is claimed is:

1. A method of forming a pourable, liquid shortening comprising the steps of:
   1. forming a batch comprising a mixture of a minor amount of finely divided, substantially fully saturated, normally solid glycerides, at least 90 percent of which are convertible to the form of beta crystals, dispersed in a liquid fatty ester triglyceride, vegetable oil;
   2. heating the batch to a temperature above the melting point of the solid glycerides to form a large, constant temperature, warm body;
   3. dynamically and incrementally cooling the warm body in a circulation stage comprising:
      a. continuously removing a minor, warm portion from a first point of the warm body;
      b. rapidly cooling the removed portion to a temperature below the crystallization point of the solid glycerides to form a cooled suspension of solid crystals in said oil;
      c. returning the cooled suspension portion to the warm body at a point remote from said first point and melting said crystals thereat to incrementally cool said body;
   4. continuing steps (3) (a), (b) and (c) until the solid crystals returned to the body at said remote point are not completely melted in said body and the body is cooled to a temperature below the temperature of phase change of the solid glycerides from alpha and beta prime to beta crystals;
   5. then holding the body at said phase change temperature to convert all of said solid glycerides to a stable, intimate suspension of beta crystals in said oil; and
   6. deaerating the suspension;

2. A process according to claim 1 in which step (3) (a) includes passing the removed portion in contact with the surface of a wall externally chilled to a temperature substantially below the crystallization point of the solid glycerides to form and deposit crystals thereon and scraping the crystals from said surface.

3. A process according to claim 2 in which said mixture comprises a liquid triglyceride oil vehicle containing a dispersion of less than 10 percent of finely divided, substantially fully saturated, normally solid fatty glycerides, at least 80 percent of which being convertible to the form of beta-phase crystals.

4. A process according to claim 3 in which said mixture includes from 2–7 percent of said glycerides, at least 85 percent of which are convertible to the form of beta-phase crystals which remain solid at temperatures up to 100°F.

5. A process according to claim 3 in which said liquid vehicle is absent glycerides having melting points above 60°F and comprises a naturally occurring liquid triglyceride oil that is chemically stable and substantially resistant to oxidation.

6. A process according to claim 5 in which the vehicle has an IV between 110 and 120 and is selected from soybean oil, cottonseed oil, peanut oil, corn oil, safflower oil, sesame seed oil and sunflower seed oil.

7. A process according to claim 6 in which the normally solid glycerides have an IV not greater than about 10.

8. A process according to claim 1 in which said normally solid glycerides have an IV value not greater than about 5 and comprise normally solid triglycerides having strong beta-forming tendencies.

9. A process according to claim 8 in which said normally solid glycerides comprise substantially completely saturated triglyceride fats prepared by hydrogenation of vegetable or animal oil.

10. A process according to claim 9 in which said hydrogenated vegetable oil is selected from soybean oil, safflower oil, sunflower seed oil, corn oil, linseed oil, hazelnut oil, olive oil, or mixtures thereof.

11. A process according to claim 10 in which the mixture comprises refined, partially hydrogenated soybean oil liquid vehicle, and said normally solid glycerides comprise 1 to 5 percent by weight of fully saturated soybean oil.

12. A process according to claim 1 comprising the step of adding an a silicone oil antifoam agent to the suspension.

13. A process according to claim 12 in which the antifoam agent is methyl silicone present in an amount of 1–6 ppm.

14. A method according to claim 1 further including the step of deodorizing said mixture.

15. A process according to claim 14 in which said deodorized mixture is cooled to a temperature of from 140°F to 160°F.

16. A method according to claim 15 further including the step of adding antioxidant to said deodorized mixture.

17. A method according to claim 1 further including the step of nitrogen inerting said batch.

18. A process according to claim 1 in which said portion is rapidly chilled to a temperature of from 5°F to 25°F below the cloud point of the mixture.

19. A process according to claim 18 in which the rapidly chilled portion of the batch mixture is heated to a temperature of from 5°F to 10°F below the cloud point before returning the portion to the batch.

20. A process according to claim 1 further including the step of holding said batch at constant temperature before deaerating said batch for a period sufficient to allow conversion of all of said solids from alpha and beta prime to beta phase.

21. A process according to claim 1 in which the batch is contained in an elongated container, the portion is removed from a first end of the batch and returned to a second end thereof until the temperature of the batch at said first end and throughout the batch is at least 0.5°F below the cloud point of the mixture.

* * * * *